United States Patent [19]

Shi

[11] Patent Number: 5,107,123
[45] Date of Patent: Apr. 21, 1992

[54] SOLAR ULTRAVIOLET RADIATION MEASURING DEVICE AND PROCESS

[76] Inventor: Wei-Min Shi, 81 Lincoln Ave., Piscataway, N.J. 08854

[21] Appl. No.: 519,129

[22] Filed: May 4, 1990

[51] Int. Cl.$^5$ .............................................. G01J 1/44
[52] U.S. Cl. .................................. 250/372; 250/370.15
[58] Field of Search .......................... 250/372, 370.15; 340/600

[56] References Cited

U.S. PATENT DOCUMENTS

| | | | |
|---|---|---|---|
| 3,809,905 | 5/1974 | Suga | 250/370.15 |
| 4,428,050 | 1/1984 | Pellegrino et al. | 250/372 |
| 4,468,562 | 8/1984 | Wicnienski et al. | 250/372 |
| 4,851,686 | 7/1989 | Pearson | 250/372 |
| 5,008,548 | 4/1991 | Gat | 250/372 |

Primary Examiner—Carolyn E. Fields
Attorney, Agent, or Firm—Leroy G. Sinn

[57] ABSTRACT

Provided is an ultraviolet radiation device useful to measure intensity of the ultraviolet radiation in a selected environment which has an optical-electrical converter having an optical means for expanding an ultraviolet radiation input angle of the converter, a temperature sensor and an electrical signal conditioner having means to generate an ultraviolet intensity signal which is independent of ambient temperature. A preferred device is for personal use and permits allocation of measured daily doses of solar ultraviolet radiation over multiple days to provide a predetermined total cumulative amount of ultraviolet radiation and a desired tanning of skin during sunbathing. The preferred device issues a signal when the daily allocated dose is reached. The invention also provides by using the device of the invention a process to determine prevailing ultraviolet radiation levels and cumulative amounts and a controlled process for tanning.

14 Claims, 8 Drawing Sheets

SOLAR ULTRAVIOLET RADIATION MEASURING DEVICE AND PROCESS

TECHNICAL FIELD

This invention relates to a novel ultraviolet radiation measuring device for measuring ultraviolet radiation prevalent in a selected environment. The device is useful in measuring both levels of ultraviolet radiation and cumulative amounts. It can be used to apportion exposure of persons sunbathing on a beach to ultraviolet radiation in a manner to prevent damaging sunburning to their skin, which is known to be a factor in causing skin carcinogenesis, and to inform them of the cumulative amounts of that exposure. The invention also relates to a process for exposure of the skin of a human to ultraviolet radiation or tanning the skin of a human by exposure thereof to ultraviolet radiation in measured and controlled manner to provide desired effects such as tanning without causing undesired damage to the skin such as sunburning or carcinogenesis.

BACKGROUND ART

1. The ultraviolet spectrum of solar light

The sun is a light source which has the entire ultraviolet spectrum as is shown in TABLE I. The portion of the solar spectrum which has carcinogenic properties covers the wavelength range from 290 to 320 nm. This portion of the ultraviolet spectrum is designated UVB, differentiating it from UVA, which ranges from 320 to 400 nm, and UVC, which ranges from 200 to 290 nm. Only UVA and UVB portions of the ultraviolet spectrum can reach the earth; the UVC portion, the most dangerous radiation to humans, is filtered out by the ozone layer surrounding the earth. The ozone layer also absorbs a part of UVB, thus reducing the prevalence of skin cancers in humans. Unfortunately, the damage caused by man to the ozone layer impairs its protective function, which contributes to the rapid increase in the incidence of skin cancer in humans

TABLE I

THE ULTRAVIOLET SPECTRUM OF SOLAR LIGHT

| UV radiation band | Description | Spectrum | Comments |
|---|---|---|---|
| UVA | Long-wave, near UV black light | Short-wave 320–340 nm | Not absorbed by ozone layer. |
| | | Long-wave 340–400 nm | Short-wave UVA may be harmful to humans. |
| UVB | Middle UV, "sunburn" radiation | 290–320 nm | A portion is absorbed in the ozone layer. |
| UVC | Short-wave, far UV germicidal radiation | 200–290 nm | Absorbed by ozone layer in atmosphere |

Exposure to solar radiation causes vasodilation and an increase in the volume of blood in the dermis, which is perceived visually as a reddening of the skin. Effects of solar radiation to human skin include tanning, photoaging and photocarcinogenesis.

2. The tanning effect

There are two different types of tanning resulting from exposure to solar radiation. They are immediate tanning and delayed tanning. Immediate tanning or immediate pigment darkening is a transient grayish brown discoloration of the skin induced by exposure to UVA and other visible light of certain wavelengths. It begins during the exposure and is maximal at the end of the radiation period. Persistence of the effect depends on the duration of exposure. Immediate pigment darkening will begin fading within minutes following a short exposure but will last more than 36 hours after prolonged exposure to high-intensity UVA. The immediate pigment darkening has been believed to give ultraviolet protective action for a long time, although there were claims that question the effectiveness of this action. The degree of the immediate darkening is dependent on the skin type of an individual, the extent of previous tanning, and the exposure dose, the darker the nature of the skin and previously acquired tan, the more pronounced the response.

Delayed tanning occurs 48 to 72 hours following the ultraviolet exposure, peaks in 7 to 10 days, and persists for several weeks to months. It can be maintained by repeated exposure to ultraviolet radiation. Delayed tanning involves much more complex reactions in skin. Both UVA and UVB induce delayed tanning. The latter is much more effective in inducing tanning than the former.

The same degree of skin tanning can be achieved differently. Tanning can follow sunburning with UVB or can occur over a long period when an individual is subjected to multiple low exposure. Obviously, the latter is a more healthful way to obtain skin tanning.

Because of the delayed appearance, the tanning degree of the delayed tanning cannot be evaluated at the time of sunbathing and at a real time basis during the sunbathing. Therefore, there is a large possibility that an individual will receive a higher dose of solar ultraviolet radiation than is required to achieve a desired tanning degree. This may result in not only more tanning, but may also subject the individual to the dangers of skin cancer induced by excessive exposure to solar ultraviolet radiation.

Therefore, a device is needed to alert an individual with information about the daily accumulated dose of solar ultraviolet radiation predetermined to provide a desired skin tanning degree over a specified number of days.

3. The carcinogenesis properties of solar ultraviolet radiation

Skin cancers are the most common cancers in human populations, with more than 550,000 new cases reported annually in the United States. This is responsible for at least 30% of the annual primary cancer diagnoses in the country. The occurrence rate of skin cancer has been increasing dramatically each year.

It has been well recognized that solar ultraviolet radiation is the predominant causal factor in cutaneous carcinogenesis in humans. Experimental studies indicated that the ultraviolet B (UVB; 290–320 nm) portion of the solar spectrum is primarily responsible for the carcinogenesis properties of sunlight. Solar ultraviolet radiation is responsible for 90 percent of squamous and basal cell carcinomas (SCC and BCC). It has also been implicated in melanoma, which accounts for only 7 percent of skin cancers, but for 80 percent of deaths from skin cancer. These three types of cancers account for nearly all the cases of skin cancer.

Epidemiologic studies revealed important characteristics of skin cancer in humans. The prevalence of human skin cancer correlates inversely with the degree of melanogenic pigmentation and with the geographic latitude away from the equator. A dramatic increase in the prevalence of skin cancer in light-complexioned Celts who migrated from the British Isles to Australia has also been reported. More than 90% of skin cancer in white persons occurs on sun-exposed areas of the body; and such lesions occur more frequently in individuals who receive greater sun exposure. It can be concluded that the prevalence of skin cancers is considerably higher in the sunbelt states, in the white population, and in locations near the Equator. The longterm clinical and epidemiologic studies provided strong evidence to support this conclusion.

About one hundred years ago, attention was focused on the clinical degenerative and neoplastic changes seen in the sun-exposed skin of sailors. In 1920, observations were reported that grape pickers in the vineyards of Bordeaux, France developed cancers commonly in sun-exposed skin but only rarely in protected skin. In 1928, experiments were conducted to demonstrate irritation from a mercury arc light source to induce skin cancers in laboratory animals. It was also found that short wave light (wavelength less than 320 nm) is responsible for carcinogenesis in mice. This finding was further supported by numerous studies which confirmed that the light of wavelengths ranging from 290-320 nm is a highly effective inducer and promoter of skin cancer in rodents.

Over the years, extensive efforts have been directed to discovering the mechanisms of the UV induction of skin cancers. Results of in vivo experiments using laboratory animals have clearly demonstrated that skin cancer is associated with a failure of the immune system to recognize tumor antigens and/or to destroy malignant cells. Recent observations concern aberrations in the appearance and distribution of Langerhans' cells (LCs) in the epidermic components of squamous cell carcinomas and suggest that epidermic LCs, which are considered the outmost sentinels of the immune system, play a relevant role in the development of UV-induced skin cancers in humans. Other studies further suggested that UV radiation not only induces skin cancers in laboratory animals but also promotes their development and causes the emergence of tumor-specific "suppressor" T cells (Ts) that prevent the immunologic destruction of these cancers.

In conclusion, solar UV radiation can initiate and promote skin carcinogenesis in humans. UVB damages DNA and suppresses the functions of the immune system defending the intruders, which allow tumors to grow.

4. Factors affecting the risk degree of solar UV radiation The risk degree of solar ultraviolet radiation is individually different. Many factors may contribute to this difference. They include:
an individual's skin type and its condition
spectrum of the ultraviolet radiation
intensity of the ultraviolet radiation
total exposure time
time of day of exposure 1) Individual's skin type and its condition Human skin may be divided into four types according to their risk degree to be damaged from solar ultraviolet exposure. Statistics obtained from a study involving 104 patients show the following percentages distribution by skin type:

TABLE II

| Skin Type | % | SKIN TYPE Comments |
|---|---|---|
| I | 6 | Always burns easily, never tans |

TABLE II-continued

| Skin Type | % | SKIN TYPE Comments |
|---|---|---|
| II | 27 | Burns moderately, tans gradually and uniformly |
| III | 63 | Burns minimally, always tans well |
| IV | 5 | Rarely burns, tans profusely |

The minimal UV radiation dose initiating the skin damage (erythemal) also depends on the condition of the skin, including its thickness, amount of melanin in the skin, and its moisture. People should be knowledgeable about their skin type and conditions. Although one cannot easily change them, at least this knowledge helps one to learn his risk degree to solar ultraviolet radiation.

2) Spectrum of ultraviolet radiation

The damage degree of ultraviolet radiation to skin is dependent upon the spectrum of the UV radiation. UVB radiation, particularly the shorter wavelengths, is most efficient in causing erythemal and sunburn. All UVA radiation can also cause erythema, but levels 800 to 1000 times higher than those of UVB are required. That suggests the risk degree of UVA is a lot smaller than that of the same dose of UVB, but it is not 800 to 1000 times smaller. The reason is that there is much more UVA in the solar spectrum than UVB.

As the wavelength increases, the risk factor decreases. At wavelengths above 340 nm (long UVA), erythema may be difficult to detect except in highly susceptible people, such as those with type I skin.

The spectrum of ultraviolet radiation is variable during the day and according to the weather conditions. The following lists the intensity ratio of the UVB to UVA at different times during the day.

TABLE III

| UV RADIATION vs. DAY TIME | | |
|---|---|---|
| TIME | UV RADIATION INTENSITY | RATIO (UVB:UVA) |
| <10:00 am | Moderate | <1:1 |
| 10:00 am-2:00 pm | Strongest especially in summer | 7+:1 |
| >2:00 pm | Moderate | <1:1 |

Weather conditions affect the effect of solar ultraviolet radiation. Higher humidity will increase UV penetration, especially at shorter wavelengths. Some people believe that clouds can attenuate UV radiation. Clouds can absorb only infrared radiation, but not ultraviolet radiation. Therefore, solar ultraviolet damage occurs at nearly the same rate on hazy days.

3) Intensity of the ultraviolet radiation

It is easy to understand that over the same period of time of exposure to solar ultraviolet radiation, the higher the intensity of the UV radiation, the higher the risk of skin damage.

4) Total exposure time.
Same as 3).

5) Time of day of exposure

Because the intensity of solar ultraviolet radiation and the ratio of the UVB to UVA is variable throughout the day, sunbathing between 10:00 am and 2:00 pm, especially in summer, increases the risk of UV damage to skin over sunbathing before 10:00 am or after 2:00 pm.

In view of the importance of preventing undesired damage to skin caused by overexposure of skin to solar ultraviolet radiation and the desire of man for skin tanning, it is desired to provide improved devices for measuring levels and cumulative amounts of ultraviolet exposure and to apportion a tanning amount of ultraviolet radiation on a daily basis over a period of days to obtain a desired tanning. It is also desired to provide an improved method for safe and controlled tanning.

SUMMARY OF THE INVENTION

The device of this invention can be used by an individual to design a personal daily, weekly or monthly plan to achieve skin tanning over a designated period of time of multiple low ultraviolet radiation dose exposure (skin tanning diary). With control over the doses of UV exposure, an individual can avoid overexposure to UV radiation.

The device will inform an individual of the intensity of UV radiation. This information will help a person to schedule outdoor activity during the period of the day when the UV radiation is relatively less dangerous.

The present device has two models, a portable unit for individual use and a large display unit for public use. The personal use portable device is desirably about the size of a small portable electronic calculator or less and is lightweight. It is suitably powered by one or more small batteries or by solar batteries.

It is contemplated that the large display post model will be installed at a beach or other places for public use. The advantages of the public model include: 1) large display providing information to many people; 2) high accuracy, without errors induced by improper individual interactions; 3) no power-consumption concerns; and 4) direction-independent measurement. The public use device as compared with the personal model device has less user flexibility, does not provide information on individual UV exposure dose; and is not used in allocation of ultraviolet radiation for control of personal skin tanning.

The personal model can be modified so that its case can be designed to include a small compartment for storing sun lotion packages for user convenience.

In accordance with one aspect of the present invention, there is provided a device for measuring solar ultraviolet radiation incident on an area in an environment comprising:

an optical-electrical signal converter for generating an electrical current signal proportional to the intensity of ultraviolet radiation incident on said area in said environment, said converter including optical means for expanding an ultraviolet radiation input core angle of said converter;

a temperature sensor for generating a voltage signal proportional to ambient temperature in said environment;

an electronic signal conditioner for receiving an electrical current signal from said temperature sensor and generating a voltage signal proportional to the intensity of ultraviolet radiation incident on said area, said signal conditioner including means responsive to a temperature signal from said temperature sensor for processing a received current signal from said signal converter in order to generate an ultraviolet intensity signal which is independent of ambient temperature in said environment;

a processor for processing a voltage signal from said signal conditioner to provide display signals indicative of measured radiation; and a display device for displaying information about measured ultraviolet radiation incident on said area in response to display signals from said processor.

The device can include data input pad or other means for input of personal information such as the user's skin type, amount of tanning which the user has and the amount desired at the end of a predetermined time, such as at the end of a one-week vacation, and the like.

The device can be suitably housed, for example, in a case made of an appropriate polymeric material. The case can have an appropriate compartment for convenient storage of one or more sun tan lotion packages.

The invention also includes a method for measuring UV radiation of the use of the described device of the invention.

Also, included in the invention is the use of the device of this invention to provide controlled tanning by using UV radiation measurement including cumulative measurement and UV radiation dose allocation.

BRIEF DESCRIPTION OF THE DRAWINGS

The invention will be better understood in light of the following description of several specific embodiments thereof. The description is made with reference to the accompanying drawings wherein.

DETAILED DESCRIPTION OF THE INVENTION AND PREFERRED EMBODIMENTS

Figure 1:
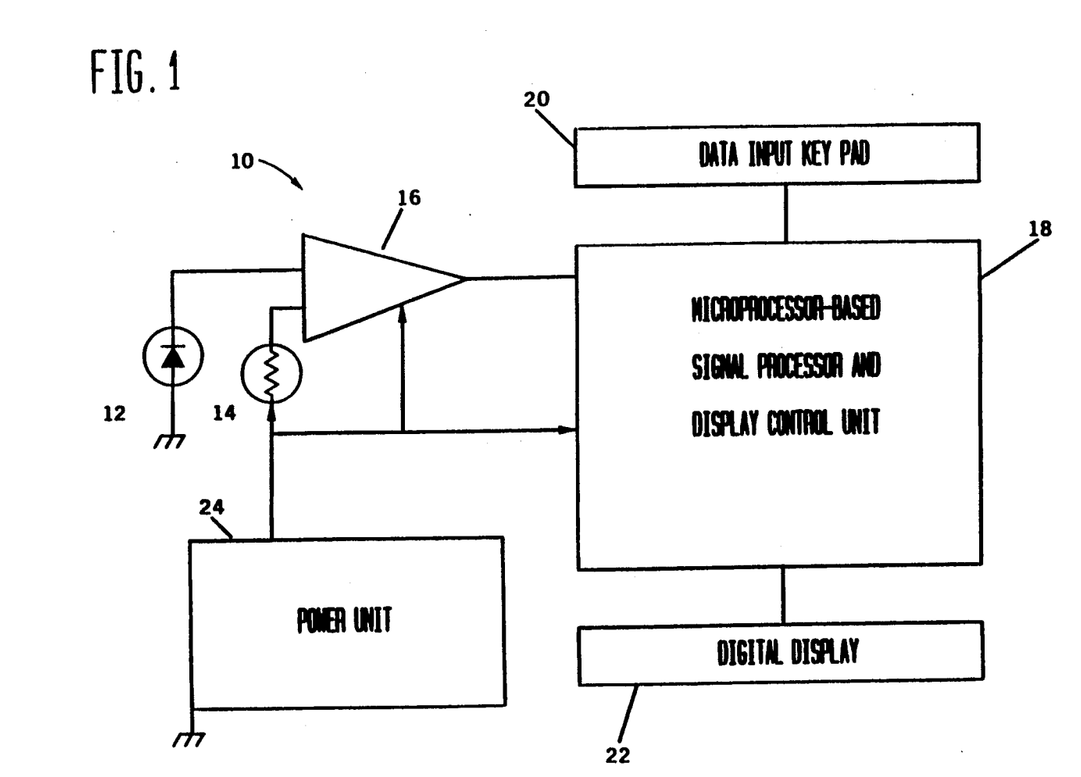
FIG. 1 is a block diagram of a solar ultraviolet meter of this invention.

FIG. 1 is a partial block diagram showing a first embodiment of a device 10 in accordance with the present invention for measuring solar ultraviolet radiation. Device 10 includes an optical-electrical signal converter 12 for collecting ultraviolet radiation and generating electrical signal proportional to the intensity of the collected ultraviolet radiation. In the preferred embodiments, the optical-electrical converter 12 responds only to optical radiation in the ultraviolet spectrum. During use of device 10 for sunbathing outdoors, the optical-electrical signal converter 12 is directed upwardly toward the sky and preferably toward the sun.

A temperature sensor 14 is located in close proximity with the optical-electrical signal converter 12. Sensor 14 monitors the ambient temperature in the measurement region and provides electrical signals indicative of the monitored temperature. Preferably, temperature sensor 14 comprises a miniature-size semiconductor thermistor. The temperature signal from sensor 14 is used to provide for a display of the ambient temperature in the monitored area, and for further processing of the UV intensity signal from the optical-electrical converter 12 as will be described in the following.

Outputs from converter 12 and temperature sensor 14 are applied to the inputs of an electronic signal conditioning circuit 16. Both the solar ultraviolet radiation intensity signal and the temperature signal generated by the optical-electrical signal converter 12 and the temperature sensor 14, respectively, are conditioned by the conditioner 16. Signal conditioner 16 in turn has its output connected to an input of a processor 18 to thus provide conditioned signals to the processor.

In the preferred embodiments, processor 18 is an integrated microprocessor-based signal processor and display control unit. Processing and display control unit 18 is a commercially available element such as the HD63LO5F1 COMS MCU made by Hitachi Corporation which is capable of performing analog-to-digital signal conversion, signal amplification, digital filtering, information storing, table consulting, mathematical calculations, timing functions, calendar functions, alarm control, display control, and data input key pad control among its functions. As apparent to those of ordinary skill in the art, these functions likewise can be carried out using discrete electronic elements. Processor 18 converts the analog solar ultraviolet intensity signal and the analog temperature signal into their corresponding digital signals. From the digital signals, processor 18 generates display signals representative of the instantaneous radiation levels present in the area sensed by device 10. Processor 18 also integrates the measured levels over time to calculate an accumulated ultraviolet radiation value used to obtain a prescribed radiation dose. Processor 18 stores the current radiation level value and the accumulated radiation value in internal memory.

A data input key pad 20 is used by an individual user to input information such as the individual's skin type, desired degree of skin tanning over a designed period of time, and other data which might include, for instance, the type of sun lotion used. Those skilled in the art of this invention can incorporate specific sun tan lotion use into determination of $D_s$. Based upon the input information and information permanently stored in processor 18, such information pertaining to delayed tanning effects, processor 18 will provide a calculated ultraviolet radiation dose needed to achieve the goal of the user. These data will be stored internally by the processor 18 for recall at the convenience of the user. By means of the data input key pad, the user can input into the device the daily dose of the solar ultraviolet radiation received. This data will be stored and accumulated by the device over the course of use by the user. This data will help the user keep track of his skin tanning plan. The data input key pad 20 will also be used by the user to select and control the information displayed by the device. The information that may be selected for display include: the real-time intensity of the solar ultraviolet radiation, the exposure dose of the solar ultraviolet radiation, time, date, temperature, data of the skin tanning diary.

Display is made by a digital display unit 2 which is a commercially available, multiple digital liquid crystal display unit. Under the user's control through processor and display control unit 18, the digital display 22 will display information such as the real-time intensity of the solar ultraviolet radiation, the exposure dose of the solar ultraviolet radiation, time, date, temperature, data of the skin tanning diary.

A power unit 24 is also provided. Power unit 24 could comprise batteries, solar batteries, photovoltaic cells or the like. Unit 24 provides power for the entire device 10 and can be changed if and when necessary.

Figure 2:
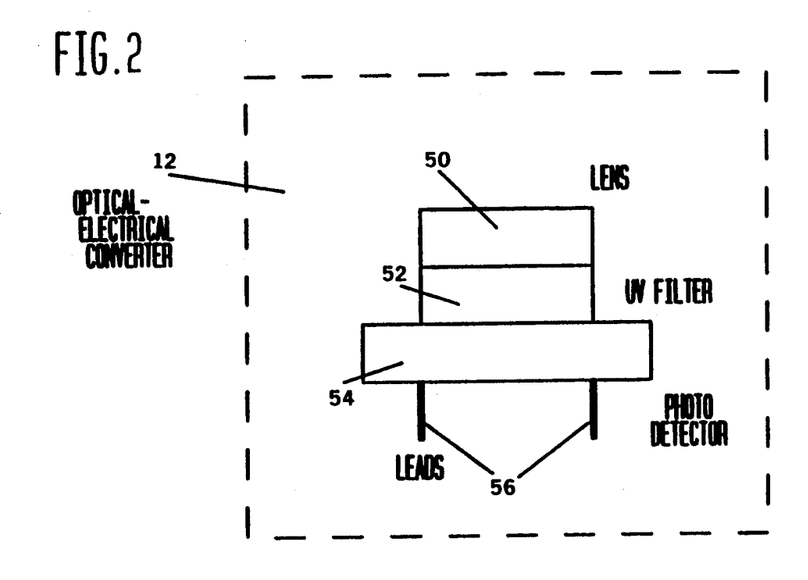
FIG. 2 is a block diagram of the optical-electrical converter 12 shown in FIG. 1.

FIG. 2 shows the construction of a preferred optical-electrical signal converter. Preferred converter 12 includes a lens 50 positioned over an ultraviolet filter 52, and a photodetector 54 located beneath the filter. Lens 50 is formed of fused silica or other materials which have a relatively small attenuation coefficient to ultraviolet light. In a preferred embodiment, lens 50 is plano-convex and has a focal length of about 3.8 mm. Lens 50 increases the receiving cone angle of the optical-electrical signal converter 12 to decrease the direction-dependence of device 10. The UV filter 52 is based on applicable interference principles and is constructed from a dielectric material such as $MgF_2$, or other suitable materials. By selecting different UV filters, the optical-electrical signal converter 12 can be made to respond to different wavelength UV light such as UVA, UVB, or UVA and UVB. The photodetector 54 is located at the focal point of lens 52 to convert the optical input energy of light to electrical current. The two leads 56 of photodetector 54 are connected to the common ground and an input port of the signal conditioner 6, respectively.

Figure 3:
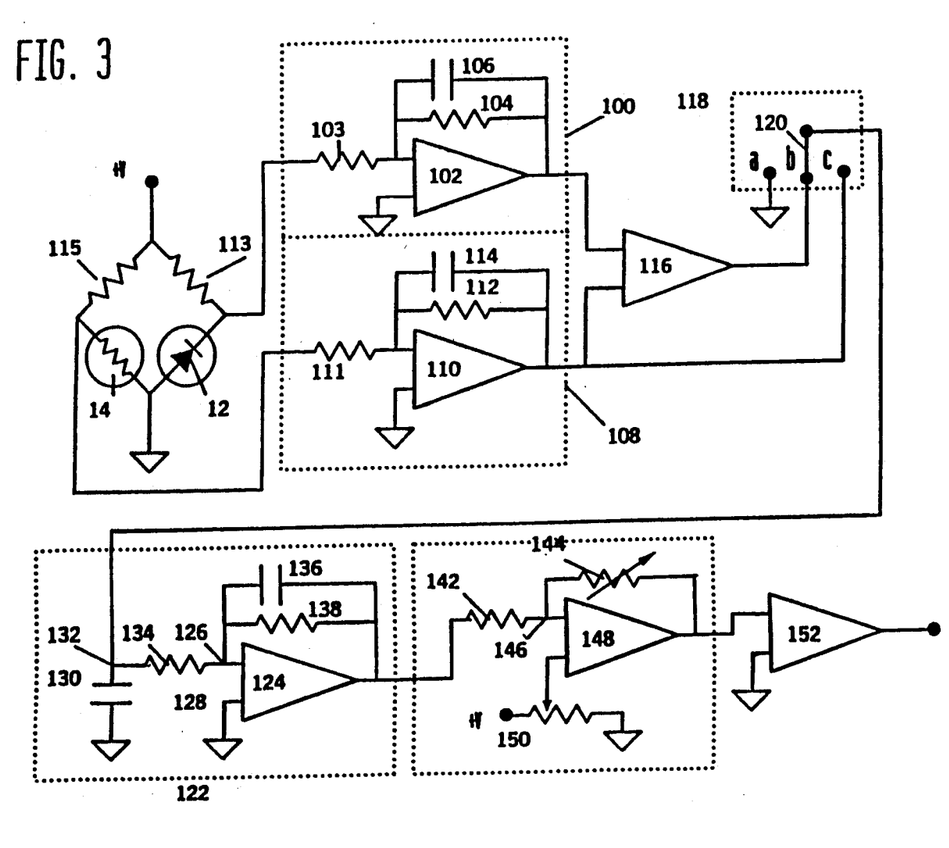
FIG. 3 is a circuit diagram of the electronic signal conditioner 16 shown in FIG. 1.

FIG. 3 is a circuit diagram showing a preferred electronic signal conditioning circuit 16 for use in the device according to the present invention. In FIG. 3, optical-electrical signal converter 12 and the semiconductor thermistor 14 also are shown connected to the inputs of conditioning circuit 16. Optical-electric converter 12 is connected to a preamplifier 100 comprising an operational amplifier (OP-AMP) 102, an input resistor 103 and a parallel combination of a resistor 104 and a capacitor 106. Preamplifier 100 amplifies the ultraviolet intensity signal generated by the optical-electrical signal converter 12. Likewise thermistor 14 has its output connected to the input of a preamplifier 108 comprising an OP-AMP 110, an input resistor 111 and a parallel combination of a resistor 112, and a capacitor 114 for amplifying the temperature signal generated by the thermistor. Converter 12 and thermistor 14 are also connected to power such as a 1.5 or 9 volt source through a corresponding pair of resistors 113 and 115. Outputs from preamplifiers 100 and 108 are connected to the inputs of a differential amplifier 116 to apply the preamplified UV level signals and temperature signals to the differential amplifier.

Amplifier 116 comprises a high CMRR differential amplifier acting as a subtractor for carrying out subtraction between the UV signal and the temperature signal. Since the photodetector 54 of converter 12 provides an output which is also dependent upon ambient temperature, the amplified UV intensity signal from preamplifier 100 is processed by the subtractor 116 to provide an output that is a temperature-independent radiation level signal. In the preferred embodiments, photodetector 54 and converter 12 are responsive to temperature.

The output from subtractor 116 is connected to one contact b of a one-through-three stop switch 118. Switch 18 permits user selection of the input signal for the microprocessor-based signal processor and display control unit 18. The switch 118 has two other positions provided by contacts a and c. At position a, no signal is selected and the downstream circuit elements are grounded whereby the device 10 can carry out, for example, a time display or any functions other than displaying the ultraviolet intensity or the ambient temperature. When switch 118 is set at position c, the movable contact 120 is connected to receive a temperature signal from preamplifier 110.

When the movable contact 120 is set in position B as shown in FIG. 3, the preamplified, temperature-independent UV level signal is applied to the input of a low-pass filter. Low pass filter 122 is an active element which eliminates noise in the incoming signal. Filter 122 includes an OP-AMP 124 having its input 126 connected to the movable contact of switch 118 and the other input 128 connected to ground. Filter 124 also has a capacitor 130 with one side connected to a node 132 and the other side connected to ground. An input resistor 134 is connected between the node 132 and input 126. A network comprising a parallel connection of a capacitor 136 and a resistor 138 is provided from the output of OP-AMP 124 to its input 126. Output from OP-AMP 124 is also applied to the input of a gain and baseline controller 140 which determines calibration for the device in a conventional manner. Gain and baseline controller 140 includes an input resistor 142, a variable resistor 144 connected between the input 146 of OP-AMP 148 and its output, and a potentiometer 150 connected to the other input of OP-AMP 148. The output from controller 140 is a conditioned signal that is fed to a buffer comprising an OP-AMP 152. In a preferred conditioning circuit as set forth in FIG. 3, the values of the circuit elements are given below:

| Element | Value |
|---|---|
| Resistor 115 | 100K |
| Resistor 113 | 1M |
| Resistor 103 | 10K |
| Resistor 104 | 2M |
| Resistor 111 | 10K |
| Resistor 112 | 200K |
| Resistor 134 | 1M |
| Resistor 138 | 1M |
| Resistor 142 | 100K |
| Resistor 144 | 1M |
| Capacitor 106 | 0.01 uf |
| Capacitor 114 | 0.001 uf |
| Capacitor 130 | 0.01 uf |
| Capacitor 136 | 0.01 uf |

Figure 4:
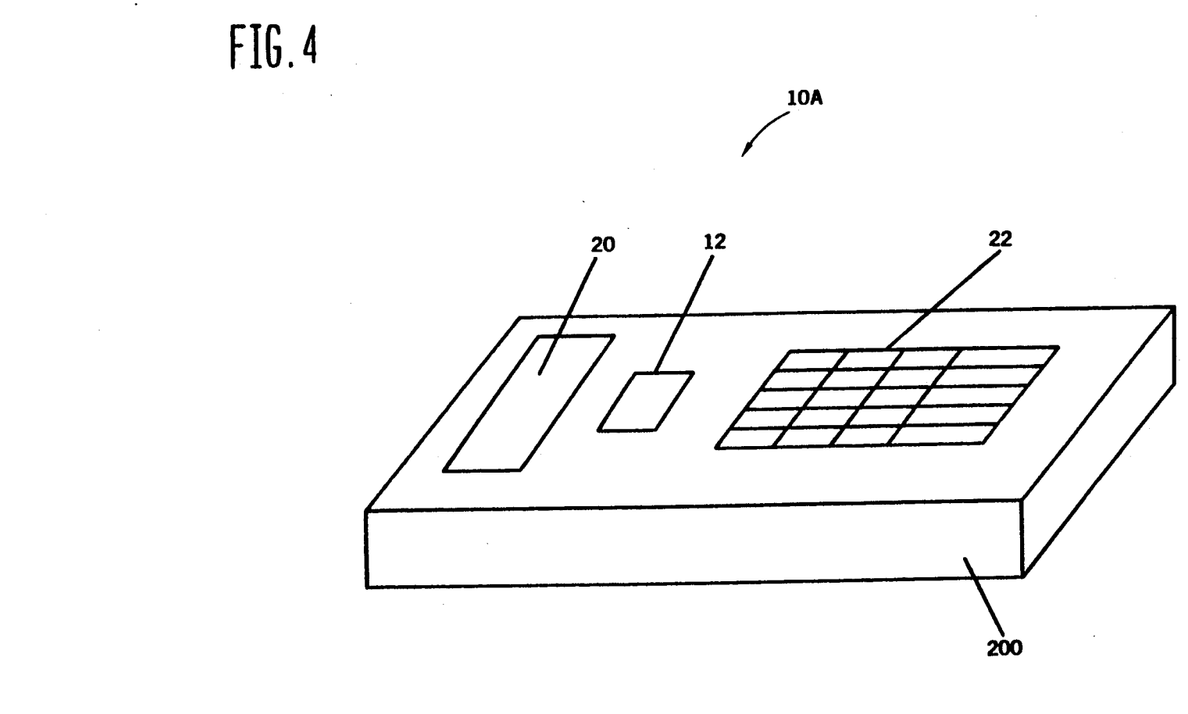
FIG. 4 is a perspective view of a portable model of the solar ultraviolet device of this invention for personal use.

FIG. 4 is a perspective view showing a solar ultraviolet meter device 10A in accordance with the present invention provided in the form of an individual-use portable model. A case 200 for the device 10A is suitably made of plastic materials. The color and shape of the case can be selected as desired.

Figure 5:
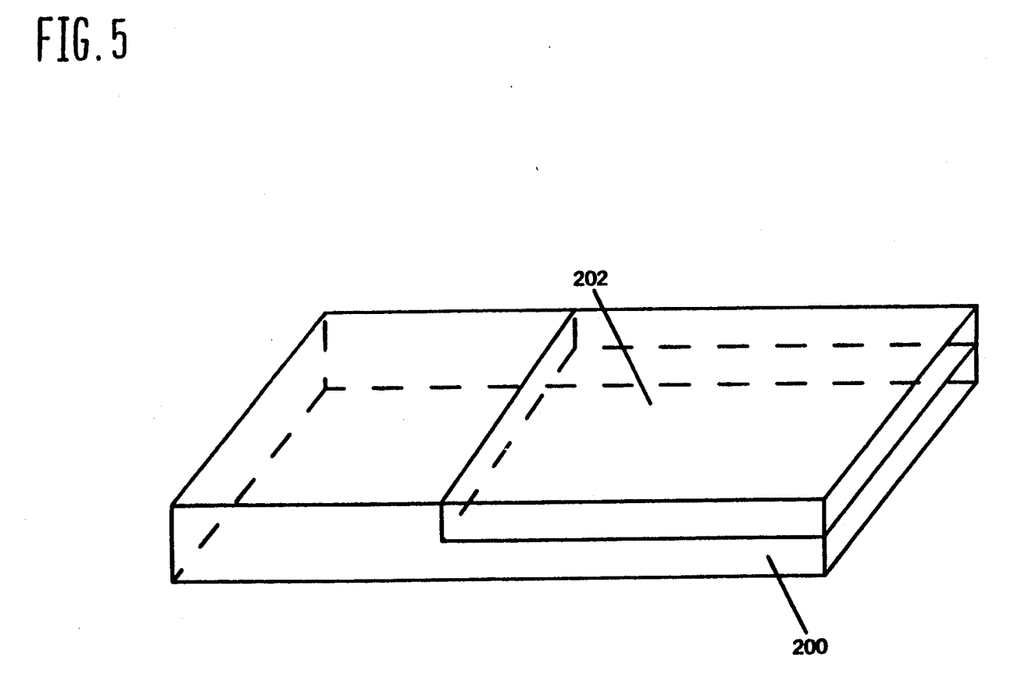
FIG. 5 is a perspective view of the bottom of the case of the portable model of the solar ultraviolet measuring device shown in FIG. 4.

FIG. 5 is a perspective view of the bottom of the case 200 for the individual-use, portable model 10A. Reference numeral 202 identifies a compartment for containing sun lotion, for example, in one or more single-use packages.

Figure 6:
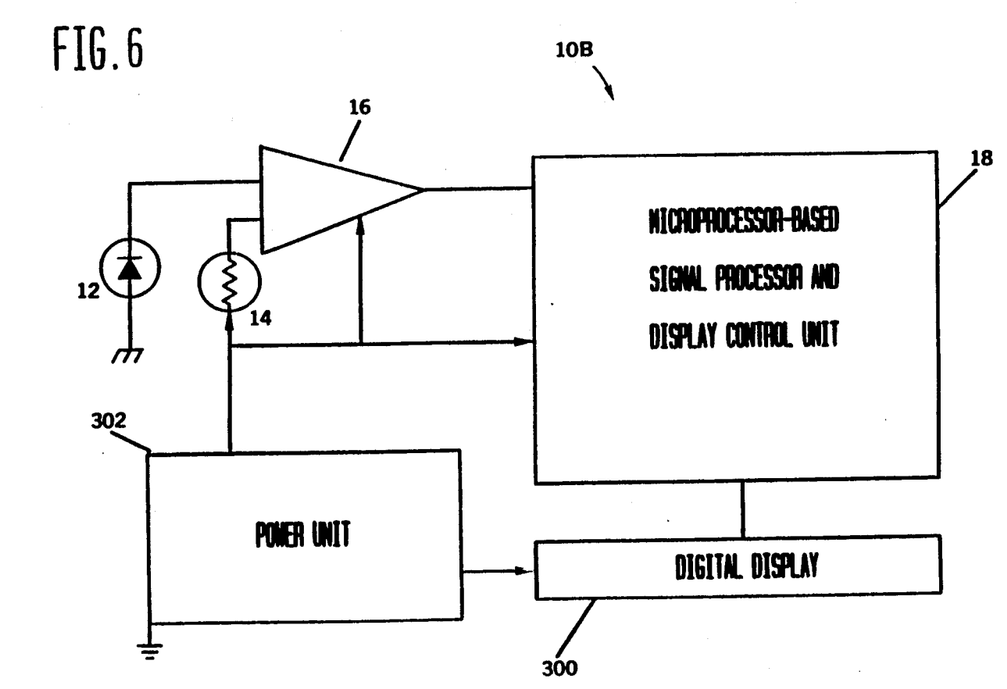
FIG. 6 is a block diagram showing a public model of a solar ultraviolet radiation measuring device of this invention.

FIG. 6 is a block diagram showing a public use model 10B of a solar ultraviolet radiation meter according to the invention. The public model 10B of the device has no data input key pad. The digital display 300 comprises a large screen and high intensity electronic digital display module. A power unit 302 powers the device 10B using line power. It is contemplated that the information to be displayed will include: the intensity of the solar ultraviolet radiation, the time and date, and the temperature. This information may be displayed simultaneously, or sequentially.

Figure 7:
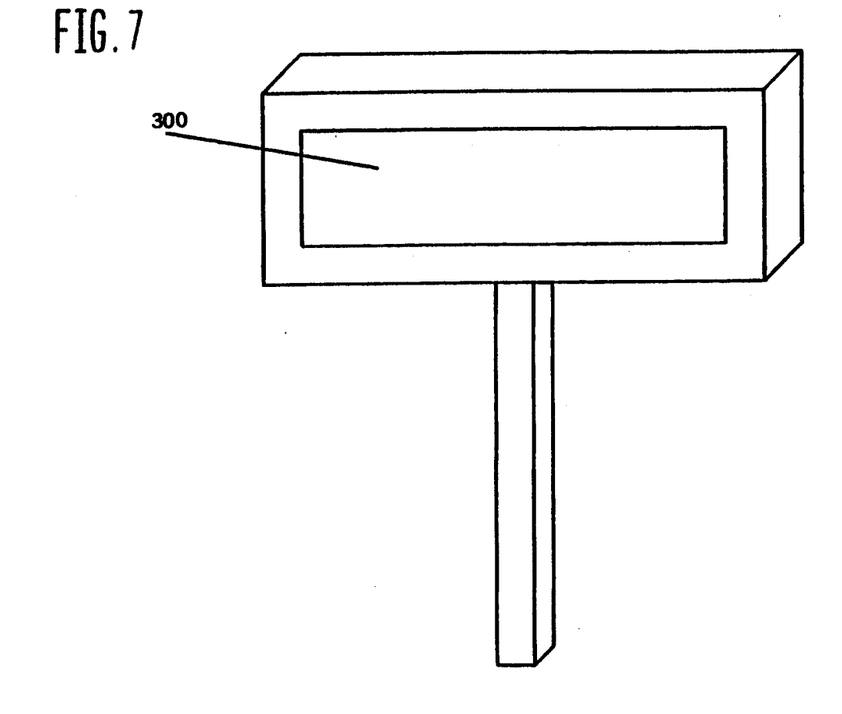
FIG. 7 is a view showing the display 300 of the device of FIG. 6.

FIG. 7 is a view showing the display 300 of the public model of the solar ultraviolet meter 10B. It will be installed at a beach or other public place.

Figure 8:
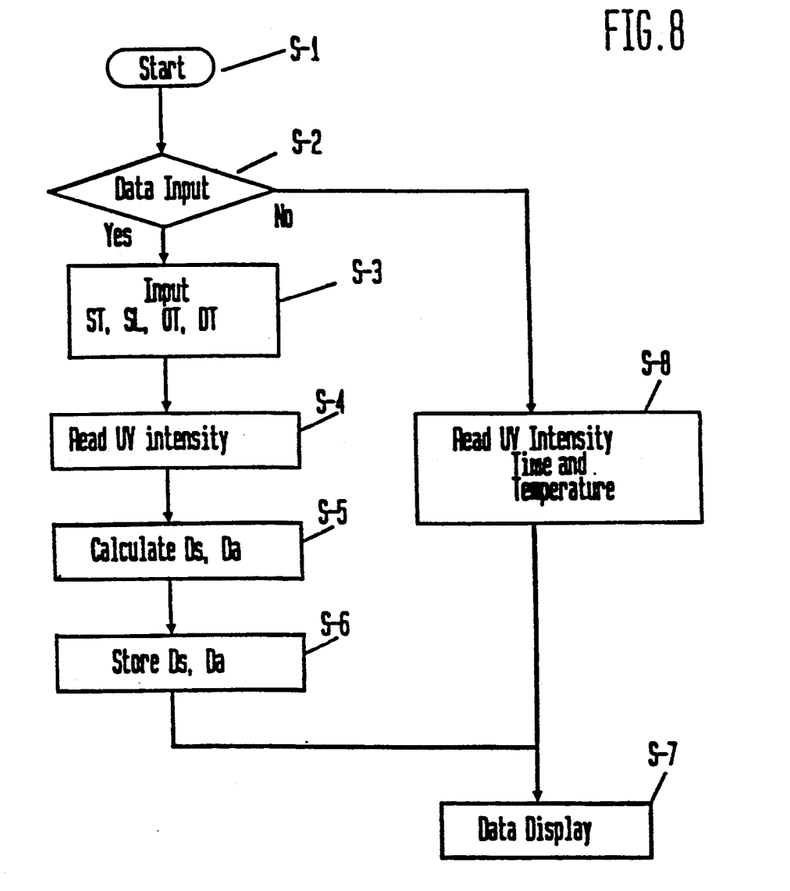
FIG. 8 is a flow chart generally illustrating operation and use of the personal use device 10A shown in FIG. 4.

FIG. 8 is a flow chart generally illustrating operation and use of the personal device 10A in accordance with the present invention. After the device is turned on in step S-1, a determination is made as to whether the user has selected to utilize the data input function in step S-2. If the data input function has been selected, the device will prompt the user to enter input concerning the user's skin type (ST), desired sunbath length (SL), original tanning (OT), and desired tanning (DT) in step S-3. The measured UV intensity is read by the processor 18 in step S-4. Then, based on the user entered input data and the monitored data, processor 18 calculates a suggested UV dose for the user to obtain the desired degree of tanning over a selected period of time in step S-5. It is contemplated that the suggested dose, $D_S$, will be calculated according to the following formula:

$$D_S = (DT-OT)e^{(4ST/SL)}$$

An accumulated UV dose value, $D_A$, also is calculated by integrating the measured UV intensity over the measurement time, i.e. the time that the user has been exposed to the UV radiation. The calculated suggested and accumulated dose values $D_S$ and $D_A$ are stored for displaying in step S-6 and then displayed to the user in step S-7. If it is determined that the data input mode has not been selected in step S-2, the device 10A reads in UV intensity, time, and temperature in step S-8 and displays these data in display step S-7.

The particular advantages of the solar ultraviolet radiation meter of this invention include that it:
a) provides protection against injurious exposure to UV radiation by suggesting a "safe dose" or "threshold" of ultraviolet radiation;
b) avoids user's interaction;
c) provides flexibility;
d) has multiple functions;
e) is direction-independent;
f) is temperature-independent;
g) has a simple design and provides a simple operation principle;
h) has small size and is light weight; and
i) is energy effective.

The following Examples are illustrative of the invention and are not meant to be limiting.

EXAMPLE 1

An individual having type I skin uses the device 10A to schedule his outdoor activities. Before the outdoor activity, the intensity of the solar ultraviolet radiation is measured. If the UV levels measured by the device are high, the person is informed so as to avoid exposure to high intensity solar ultraviolet radiation, to which that person might be very sensitive or allergic.

EXAMPLE 2

An individual having type III skin uses the device 10A to schedule sunbathing. Device 10A is used to achieve desired skin tanning in an unharmful way. To use the device, the user presses the start button to initiate measurement and places the device toward the sky during sunbathing. The user then enters his skin type (ST), desired sunbath length (SL), original tanning degree (OT), and desired skin tanning degree (DT) into device 10A in response to prompts presented at this display 22. Based on the entered information and the monitored UV level, the device 10A will calculate the suggested total dose according to the formula $D_S = (DT-OT) e^{(4ST/SL)}$. Further, the device can provide a suggested average daily dose by dividing the suggested dose, $D_S$, by the number of days the user intends to sunbathe. The device continually updates an accumulated dose value, $D_A$, to determine when the daily dose received by the user has reached the suggested daily level, whereupon the device will signal the user. After sunbathing is over, the user will turn off the device. It is contemplated that the device 10A is provided with memory such that the daily accumulated ultraviolet radiation dose received by the user will be stored each day in order for calculation of a total accumulated dose. The user can retrieve the accumulated dose at any time. When the accumulated dose reaches the suggested level, the device will signal the user.

EXAMPLE 3

An individual can use the device 10A to be apprised of the time or as a timer.

EXAMPLE 4

A public model 10B of the device as shown in FIGS. 6 and 7 is placed on a beach. The device 10B simultaneously detects the intensity of the solar UV radiation and the temperature. It displays the time, the intensity of solar UV radiation and the temperature on its high intensity and large screen digital display unit 300.

What is claimed is:

1. A solar ultraviolet radiation monitoring device for measuring ultraviolet radiation incident on an area in an environment, said device comprising:
   an optical-electrical signal converter for generating an electrical current signal proportional to the intensity of ultraviolet radiation incident on said area in said environment; said converter including optical means for expanding an ultraviolet radiation input core angle of said converter;
   a temperature sensor for generating a voltage signal proportional to ambient temperature in said environment;
   an electronic signal conditioner for receiving an electrical current signal from said signal converter and a temperature signal from said temperature sensor and generating a voltage signal from said temperature sensor and generating a voltage signal proportional to the intensity of ultraviolet radiation incident on said area, said signal conditioner including means responsive to a temperature signal from said temperature sensor for processing a received current signal from said signal converter in order to generate an ultraviolet intensity signal which is independent of ambient temperature in said environment;
   a processor for processing a voltage signal from said signal conditioner to provide display signals indicative of measured radiation; and
   a display device for displaying information about measured ultraviolet radiation incident on said area in response to display signals from said processor.

2. A device as claimed in claim 1, further comprising data input means for providing user entered input data to said processor.

3. A device as claimed in claim 2, wherein said user entered input data causes said processor to generate display signals indicative of ultraviolet radiation levels in said area, a cumulative amount of ultraviolet radiation incident on said area, and a suggested radiation dose, said display device displaying said levels, and said cumulative amount and said suggested dose in response to said display signals from said processor.

4. A device as defined in claim 3, comprising a housing, and a power supply for said device located in said housing.

5. A device as claimed in claim 4 wherein said device has a compartment comprising means for housing one or more packages of sun lotion.

6. A device as claimed in claim 1, wherein said optical-electrical signal converter includes a UV filter located between said input core angle expanding optical means, and a photodetector, said optical input core angle expanding means comprising a lens.

7. A device as claimed in claim 6 wherein said UV filter is formed using a dielectric material which provides desired filtering.

8. A device as claimed in claim 1, wherein said means responsive to a temperature signal comprises a subtracting circuit.

9. A device as claimed in claim 8, wherein said signal conditioner further comprises preamplifying means connected to receive output signals from said optical-electrical signal converter and said temperature sensor and to provide input signals to said subtracting circuit, switch means, filtering means connectable to said subtracting circuit by said switch means, and control means connected to said filtering means.

10. A device as claimed in claim 8, wherein said processor comprises a microprocessor.

11. A method for measuring ultraviolet radiation incident on an area with an optical-electrical conversion element, said method comprising the steps of:
   exposing said element to ultraviolet radiation to cause said element to generate an electrical signal proportional to the intensity of ultraviolet radiation incident on said area;
   measuring ambient temperature in said environment;
   adjusting said signal proportional to ultraviolet radiation intensity according to the measured temperature to provide a temperature-independent signal proportional to ultraviolet radiation intensity; and
   calculating measured ultraviolet radiation levels and cumulative amounts of ultraviolet radiation incident on said area based upon said temperature-independent signal proportional to ultraviolet radiation intensity.

12. A method of providing controlled tanning of the skin by use of a device comprising
   an optical-electrical signal converter for generating an electrical current signal proportional to the intensity of ultraviolet radiation incident on an area in an environment; said converter including optical means for expanding an ultraviolet radiation input core angle of said converter;
   a temperature sensor for generating a voltage signal proportional to ambient temperature in said environment;
   an electronic signal conditioner for receiving an electrical current signal from said signal converter and a temperature signal from said temperature sensor and generating a voltage signal from said temperature sensor and generating a voltage signal proportional to the intensity of ultraviolet radiation incident on said area, said signal conditioner including means responsive to a temperature signal from said temperature sensor for processing a received current signal from said signal converter in order to generate an ultraviolet intensity signal which is independent of ambient temperature in said environment;

a processor for processing a voltage signal from said signal conditioner to provide display signals indicative of measured radiation; and a display device for displaying information about measured ultraviolet radiation incident on said area in response to display signals from said processor.

13. A method as claimed in claim 12 further comprising using data input means for providing user entered input data to said processor.

14. A method as claimed in claim 12 further comprising using said user input data to cause said processor to generate display signals indicative to ultraviolet radiation levels in said area, a cumulative amount of ultraviolet radiation incident on said area, and a suggested radiation dose, said display device displaying said levels, and said cumulative amount and said suggested dose in response to said display signals from said processor.

* * * * *